No. 845,281. PATENTED FEB. 26, 1907.
L. A. TIRRILL.
ELECTRICALLY OPERATED VALVE.
APPLICATION FILED SEPT. 8, 1904.

Witnesses:

Inventor,
Leonard A. Tirrill,
By Albert G. Davis
Att'y.

No. 845,281. PATENTED FEB. 26, 1907.
L. A. TIRRILL.
ELECTRICALLY OPERATED VALVE.
APPLICATION FILED SEPT. 8, 1904.

Witnesses:

Inventor,
Leonard A. Tirrill,
By
Att'y.

No. 845,281. PATENTED FEB. 26, 1907.
L. A. TIRRILL.
ELECTRICALLY OPERATED VALVE.
APPLICATION FILED SEPT. 8, 1904.

Witnesses:

Inventor,
Leonard A. Tirrill,
By Att'y.

No. 845,281. PATENTED FEB. 26, 1907.
L. A. TIRRILL.
ELECTRICALLY OPERATED VALVE.
APPLICATION FILED SEPT. 8, 1904.

Witnesses

Inventor,
Leonard A. Tirrill,
By Albert G. Davis
Atty.

No. 845,281.

PATENTED FEB. 26, 1907.

L. A. TIRRILL.
ELECTRICALLY OPERATED VALVE.
APPLICATION FILED SEPT. 8, 1904.

Witnesses

Inventor,
Leonard A. Tirrill,
By
Atty.

No. 845,281. PATENTED FEB. 26, 1907.
L. A. TIRRILL.
ELECTRICALLY OPERATED VALVE.
APPLICATION FILED SEPT. 8, 1904.

Witnesses:

Inventor,
Leonard A. Tirrill,
By
Att'y.

No. 845,281. PATENTED FEB. 26, 1907.
L. A. TIRRILL.
ELECTRICALLY OPERATED VALVE.
APPLICATION FILED SEPT. 8, 1904.

Witnesses:

Inventor,
Leonard A. Tirrill,
By Albert G. Davis
Att'y.

No. 845,281. PATENTED FEB. 26, 1907.
L. A. TIRRILL.
ELECTRICALLY OPERATED VALVE.
APPLICATION FILED SEPT. 8, 1904.

WITNESSES:

INVENTOR:
Leonard A. Tirrill,
by Albert G. Davis
Atty.

UNITED STATES PATENT OFFICE.

LEONARD A. TIRRILL, OF LYNN, MASSACHUSETTS, ASSIGNOR TO GENERAL ELECTRIC COMPANY, A CORPORATION OF NEW YORK.

ELECTRICALLY-OPERATED VALVE.

No. 845,231. Specification of Letters Patent. Patented Feb. 26, 1907.

Application filed September 8, 1904. Serial No. 223,706.

*To all whom it may concern:*

Be it known that I, LEONARD A. TIRRILL, a citizen of the United States, residing at Lynn, county of Essex, State of Massachusetts, have invented certain new and useful Improvements in Electrically-Operated Valves, of which the following is a specification.

This invention relates to means for moving a given device, such as a valve, back and forth within a predetermined range of travel by means of an electric motor; and its object is to provide an efficient system of control for the motor, whereby it may be operated from a distant station with certainty and precision. Where a large pipe or conduit is controlled by a valve, the problem of operating it speedily and easily is a serious one. For instance, some of the valves which govern the outlets of a dry-dock are five feet in diameter and take four men from twenty to thirty minutes to open or close. In large steam plants the breaking of a big main endangers many lives and may render the hand-operated throttle-valves inaccessible, so that a power-driven valve controlled from a safe point is of prime importance. The valves in water or gas mains for city supply are equipped with valves for shutting off the flow of fluid in case of accident or repairs. When they are large and unwieldly, it is more economical to operate them by power, and electric motors controlled from a central station afford the best means for applying the power. In these and other fields where a motor in doing a known piece of work revolves a given number of times and then makes the same number of revolutions in the opposite direction my invention is peculiarly applicable, and in order to render the system efficient and practical it involves several separate devices. When applied to a valve, the spindle of the valve is screw-threaded, so that it can be actuated by a nut rotated by the motor. A switch or controller shows by an index on a graduated scale the desired amount of opening of the valve, and an indicator moving over the same scale shows the actual travel of the valve. When the two indexes coincide, the motor is automatically stopped. When the controller is moved in either direction, a reversing-switch automatically connects the motor-terminals in the proper relation with the line to produce the desired direction of rotation. An overload-magnet cuts out the motor when the valve is properly seated, irrespective of the number of revolutions the motor has made, so that the valve will be seated with a pressure that is always constant. One or more emergency-switches controlling a clutch on the controller enable the latter to be thrown to one end of its range of movement by a spring when necessary.

The invention is fully illustrated in the accompanying drawings, in which—

The valve shown is of the sliding-gate type. The gate 1 and its seat 2 have a slight taper to insure a tight closure, the motion of the gate being transverse to the flow of the steam or other fluid through the pipe or conduit 3. The spindle of the valve passes through a bonnet 4, which receives the gate when open. The upper portion of the spindle 5 is screw-threaded and meshes with a nut 6, rotatable in a cylindrical bearing in a bridge 7, supported on a yoke 8, surmounting the bonnet. A gear-wheel 9 is keyed on the nut with its hub resting on the bridge, which thus sustains the downward thrust on the nut when the gate is being opened. Above the gear-wheel the nut has a rotating fit in the upper end or cross-piece 10 of the yoke, which supports a screw-gland 11, abutting on the nut to resist the upward thrust when closing the gate. The lower end of the nut is reduced in diameter to receive a worm 12, secured by a nut 13 and meshing with the driving-gear of the interrupter. The gear-wheel 9 is connected by a train of gears and pinions 14 with the armature-shaft of a series-wound electric motor 15, whose frame is secured to the yoke 8. A hand-wheel 16 enables the valve to be operated by hand when desired.

Figure 26:
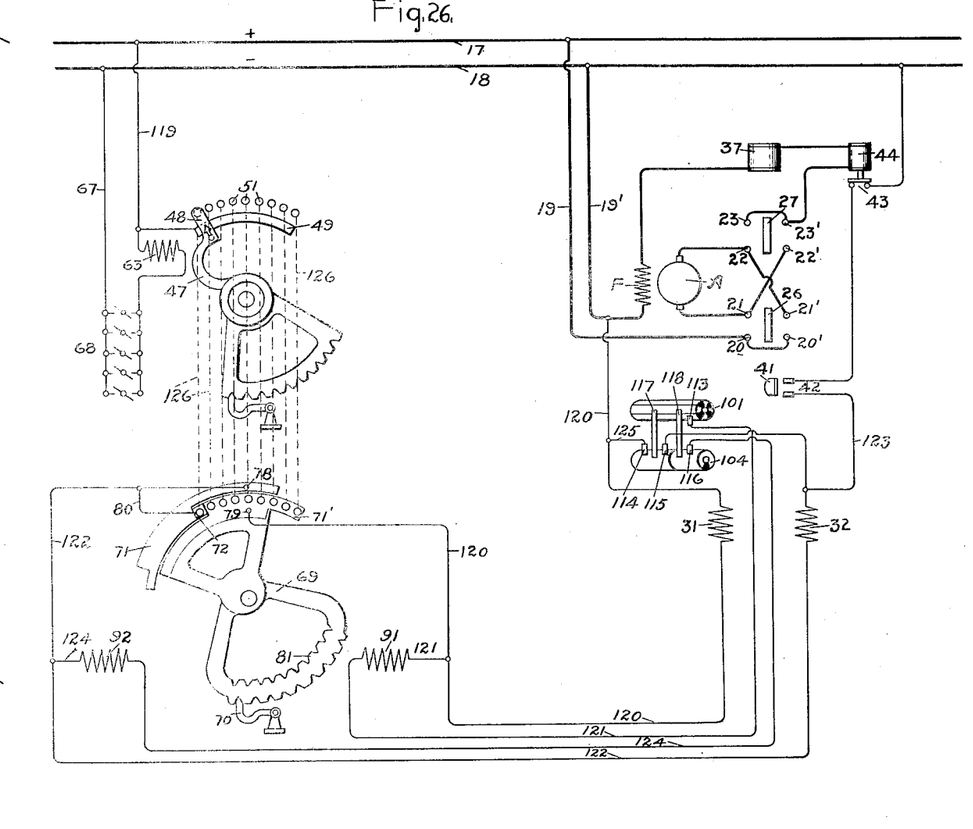
Fig. 26 is a diagram of the wiring.

A direct-current generator is connected by mains 17 18 with the motor through a reversing-switch. In the diagram Fig. 26 the motor-leads are shown by heavy black lines. It will be seen that the positive main 17 is connected by a lead 19 with a pair of opposite stationary contact-clips 20 20' of the reversing-switch. Two cross-connected pairs of clips 21 21' and 22 22' are connected, respectively, with the terminals of the motor-armature A. A fourth pair of connected clips 23 23' is connected with one terminal of the field-coil F of the motor, the other terminal being connected by a lead 19' with the negative main 18. In series with the field-coil are a blow-out coil and an overload-coil hereinafter referred to more in detail. These four pairs of clips are mounted on two parallel strips 24 of insulation, rigidly secured inside of a suitable box 25. Between the clips are four switch-blades connected in pairs 26 27 and all mounted on and insulated from a rock-shaft 28, parallel with the strips 24. Two short rock-arms or cranks project from opposite sides of this shaft, each of which is pivotally connected with a cylindrical bell-shaped armature 29 30, concentric with an electromagnet 31 32, whose cores 33 are secured to dished bases 34, into which the coned ends of the armatures fit. The bases are preferably hinged to the bottom of the box 25. The switch-blades are held in a central position between the two sets of clips by opposing springs 35, connected at one end with the box and at the other end with arms 36, rising at each end of the rock-shaft. A blow-out magnet 37 in series with the field-coils of the motor is provided with pole-pieces 38, preferably three in number, extending between the pairs of clips, which are separated from each other by barriers 39 of insulation, supported by plates 40 of the same material. Fastened on one end of the rock-shaft is a piece of insulation carrying a contact 41, adapted to bridge two stationary contacts 42 when the rock-shaft is oscillated in one direction. The contacts 42 are in series with a switch 43, controlled by an overload-coil 44, which is in series with the field-coils of the motor and the blow-out magnet. The switch is in a shunt which affords a second path to the negative main for the current passing through the closing-magnet 32 of the reverser, for a purpose hereinafter set forth.

Having described the motor and the reversing-switch and their connections, let us now turn to the device by which these elements can be controlled from a distance and the movement of the valve signaled back to the distant control-station. The controller is simply a rotary switch-arm making contact step by step with a plurality of parallel circuits connected with a device which directs the current through one or the other of the two reverser-magnets 31 32. This device also serves as an indicator to denote the travel of the valve, being actuated step by step in the same direction as the switch-arm by means of electromagnets controlled by a circuit-interrupter geared to the valve-spindle. The indicator also serves to open-circuit the reverser, and thus stop the motor when the indicator in its step-by-step movement has overtaken the switch-arm.

The preferred construction of these various elements is as follows: The mechanism of the combined controller and indicator is inclosed in a box 45, in the back of which is fixed a transverse stud 46. On this is rotatably mounted the switch-arm 47, carrying an insulated spring-contact 48, which slides on a segment 49, suitably supported on a board 50 of insulation and also makes contact with a plurality of contact-studs 51, mounted in the board 50 on a curve concentric with the pivot-stud 46. The switch-arm also carries a pointer 52, moving over a scale-plate 53, located behind a glazed window in the box and graduated to indicate the fractional openings of the valve between the tightly-shut and the completely-open positions. The drawings provide for opening the valve by eighths.

The switch-arm is actuated by a lever 54, pivoted on the stud 46 and having a hub 55 projecting through the front of the box and provided with a handle 56 and an index 57. Inside the box the lever has a notched sector 58, with which a spring-detent 59 engages to hold the lever yieldingly in its several positions. The lever is preferably connected with the switch-arm by a clutch, such as a latch 60, pivoted to the lever and engaging with a notch 61 in the hub of the switch-arm. A helical spring 62 encircles said hub and is attached at one end thereto, its other end being secured to the hub 55 of the lever. TThe spring is given a certain tension to cause the switch-arm to swing over to one end of the row of contact-studs when the clutch is tripped by lifting the latch out of the notch. In the case of a steam-valve the arm will move in a direction to shut the valve; but in a water-valve it may be desirable to have the arm move the other way, in order to open the valve.

The clutch can be tripped in case of an emergency by means of an electromagnet 63, whose armature is carried on a lever 64, which has at its outer end a curved finger 65, concentric with the pivot-stud and passing between the laterally-projecting nose of the latch and a pin 66 on one side of the latch. Normally the pin rides idle back and forth on the finger; but when the magnet is energized the lever 64 is lifted, the latch is thereby disengaged from the notch 61, and the switch-arm is free to be moved by the spring. The tripping-magnet 63 is connected across the line by a conductor 67, controlled by a plurality of parallel normally open switches 68, the closing of any one of which will energize the magnet 63. These switches are distributed about the station, yard, or other plant, where they are readily accessible in case of necessity.

Figures 8, 9:
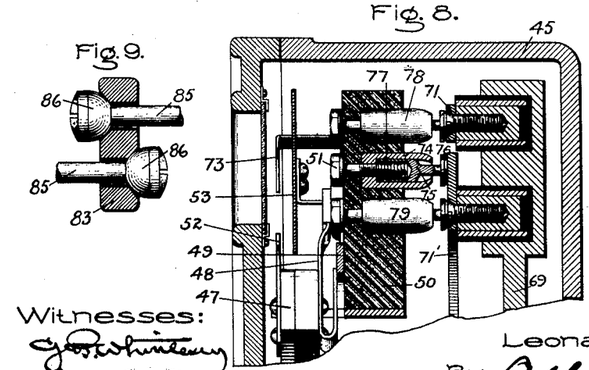
Fig. 8 is a detail section taken on the line 8 8, Fig. 5, and enlarged.
Fig. 9 is a detail section on the line 9 9, Fig. 3, showing the connection of the centering-springs with the dog-carrying arm.
Figure 10:
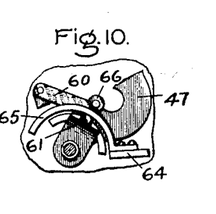
Fig. 10 is a detail section on the line 10 10, Fig. 3, showing the rear of the clutch and tripping-lever.

Concentric with the switch-arm, and preferably on the fixed pivot-stud 46, is pivotally mounted an indicator comprising a frame or ratchet-wheel 69, having sector-shaped upper and lower portions. The latter has notches in its edge to coöperate with a spring-detent 70 in holding the ratchet-wheel yieldingly in its several positions. If, as shown in the drawing, the valve is arranged to open by eighths, then the sector 58 and the ratchet-wheel 69 will each have nine notches, as shown. The upper sector of the ratchet-wheel 69 carries two contact-segments 71 71', preferably of copper, insulated from the ratchet-wheel and from each other Each segment is concentric with the pivot-stud and has a wide and a narrow portion, the wide part of one being parallel with the narrow part of the other. Between the adjacent shoulders of the two wide portions is a block of insulation 72. This portion of the ratchet-wheel carries an index 73, which coöperates with the graduations on the scale-plate 53. The contact-studs 51 pass through the board 50 into contact with the wide portions of the segments 71 71' in line with the block 72. The studs are constructed, preferably, as shown in Fig. 8—that is, the shanks of the contact-buttons screw into the bottoms of metal cups 74, set into the back of the board 50. In said cups slide hollow plugs 75, whose heads 76 are kept pressed against the segments 71 71' by springs 77, abutting between said plugs and the bottoms of the cups 74. In the "shut" position the heads 76 bear on the wide portion of the inner segment 71', all except the left-hand head, which rests on the block 72 of insulation. When the ratchet-wheel is turned toward the right, the heads 76 pass one by one onto the wide portion of the outer segment 71, the block 72 passing by each in turn. At the middle of the board 50 are two contact-studs 78 79 in line with the narrow portions of the segments. The upper stud 78 is connected by a metallic strip 80 with the extreme left-hand contact-stud 51.

The means by which the ratchet-wheel is moved step by step comprise two opposed electromagnets operating on a lever carrying a double pawl, which engages ratchet-teeth on the lower sector. The preferred construction is shown in the drawings, where the lower sector is composed of two arms united by a curved bar having the detent-notches in its outer edge and the ratchet-teeth 81 in its inner edge. The double-ended pawl 82 is pivotally supported by an arm 83, pivoted on the stud 46 and retained yieldingly in a central position by springs, preferably the opposed helical springs 84, attached at one end to the sides of the box and at the other end to rods 85, having spherical heads 86, engaging ball-sockets in opposite sides of the arm.

A crank 87 is rigidly secured to the shaft 88, on which the pawl is fastened, and its upper end is connected with two yielding stays running in opposite directions to the bottom or walls of the box. These stays are preferably helical springs 89, attached at each end to screw-threaded rods 90, by means of which their tension can be adjusted. The stays tend to hold the upper end of the crank in one position, so that when the shaft 88 is swung to and fro by the oscillation of the arm 83 the pawl will be tilted down into engagement with the teeth 81.

In order to oscillate the arm to one side or the other of its normal central position, and thus cause the pawl to engage the ratchet-wheel, two electromagnets 91 92 are arranged opposite each other with their armatures 93 94 pivoted to said arm 83 The magnet-coils, like those in the reversing-switch, are protected by brass sleeves 95, and the armatures are tubular to slide longitudinally on said sleeves. The iron bases 96 are dished, and the armatures have frusto-conical ends 97 to fit into them. This construction gives a strong pull for a short travel. When one of these magnets pulls the arm 83 toward it, the pawl is tilted down on the opposite side of the arm and slides over the teeth 81, the springs 89 permitting the crank to yield as the pawl rides over a tooth and forcing it down into the notch behind said tooth. When the magnet is deënergized, the springs 84 return the arm to its normal position, and the pawl carries the ratchet-wheel with it. Each oscillation of the arm moves the ratchet-wheel one tooth.

The device for intermittingly closing and opening the circuits of the magnets 91 92 in order to cause them to actuate the ratchet-wheel is the rheotome or interrupter. (Shown in detail in Figs. 21 to 25.) The working parts are inclosed in a box 98, secured to the yoke 8. A transverse shaft 99 has bearings in the sides of the box and carries on one end a worm-gear 100, meshing with the worm 12 on the nut 6. Inside the box the shaft carries a cylindrical drum 101, of insulation, into which are let four equidistant longitudinal metal segments 102, flush with the surface of the drum. A second shaft 103, parallel with the other, carries a cylindrical drum 104, of insulation, on which are two metal bushings 105 106, separated from each other by a circumferential ring of insulation and each having a longitudinal slit filled with insulation 107. The two shafts are geared together by a carrying-train, so that the drum 104 makes one-ninth of a revolution for every complete rotation of the drum 101. This gear is preferably of the Geneva-stop type, the periphery of a disk 108 on the shaft 99 engaging with the scalloped teeth 109 of a wheel 110 on the shaft 103, and thus locking it from turning except at the instant that a tooth 111 on the disk enters between two teeth 109 and turns the drum 104 one step. A bracket on the box carries a block 112, of insulation, on which are mounted metallic brushes 113 114 115 116, the first bearing on the drum 101, the second and third on the bushing 105, and the last on the bushing 106. Two connecting-strips 117 118 are fastened to the bar 112, with their upper ends bearing on the drum 101 and their lower ends bearing, respectively, on the bushings 105 106. The worm-gearing is arranged to impart two complete revolutions to the drum 101 during the entire travel of the valve in opening or closing.

It now remains to describe the control-wiring and the operation of the apparatus. From the positive main 17 a wire 119 leads to the segment 49 and the emergency tripping-coil 63. From the contact-stud 79 a wire 120 leads to the opening reverser-magnet 31, and thence to the negative main by way of the motor-lead 19'. A branch wire 121 of the wire 120 includes the opening pawl-magnet 91 and runs thence to brush 113 of the interrupter. From the contact-stud 78 a wire 122 leads to the closing reverse-magnet 32, and thence to the brush 115 of the interrupter. A shunt 123 leads from the magnet 32 to the contacts 42 in the reverser, thence to the switch 43, controlled by the overload-coil 44, and thence to the negative main 18. A branch wire 124 from the wire 122 includes the closing pawl-magnet 92, and runs thence to the brush 116 of the interrupter. The brush 114 of the interrupter is connected by a wire 125 with the negative main by way of wire 120 and the negative motor-lead 19'. These connections are clearly shown in Fig. 26, where for the sake of clearness the switch-arm 47 is shown separated from the ratchet-wheel 69, and the two ends of the contact-studs with which they coöperate are represented by two sets of buttons connected by wires 126.

The operation is as follows: Assume that the valve is closed and that the parts stand as shown in Figs 1, 2, 3, 4, and 26 of the drawings. In this position no current can flow through the system, the reversing-switch being open and the first contact-stud 51 resting on the insulating-block 72. To open the valve an eighth, the switch-arm is moved to the right by turning the handle 56 until the contact 48 has passed onto the second contact-stud 51. Current will now flow from the positive main 17, by way of the wire 119, segment 49, contact 48, and stud 51, to the segment 71', thence to the contact-stud 79 and wire 120 through the opening reverse-magnet 31 to the negative main. The energizing of this magnet rocks the shaft of the reversing-switch and throws the switch-blades into the clips 20 21 22 23, thereby closing the circuit of the motor and starting it in the proper direction to open the valve. At the same time the current in the wire 120 branches through the opening ratchet-wheel magnet 91 and flows thence by way of wire 121 to the brush 113 of the interrupter, segment 102 on the drum 101, connecting-strip 117, bushing 105, brush 114, wire 125, wire 120, and negative lead 19' to the negative main 18. The energizing of the magnet 91 causes it to draw back the arm 83 and engage the pawl 82 with the first tooth of the ratchet 81. The rotation of the valve-spindle causes the drum 101 to rotate slowly, and when the valve has opened one-eighth the segment 102 is withdrawn from under the brush 113, thereby breaking the circuit of the ratchet-wheel magnet 91 and permitting the springs 84 to retract the arm 83 and cause the pawl to move the ratchet-wheel one step. This brings the insulating-block 72 in line with the second contact-stud 51 and breaks the circuit of the reverse-magnet 31 through the wire 120. The springs 35 instantly open the reversing-switch and the motor stops. It will thus be evident that so long as the motor runs the ratchet-wheel will chase after the switch-arm until the insulating-block 72 is brought to the contact-stud through which the current is flowing, at which point the motor will stop, and this will be true for the reverse movements of the switch-arm from any position to which it has been advanced, the magnets 32 and 92 being then made operative through the segment 71, stud 78, and wires 122 124.

Figure 11:
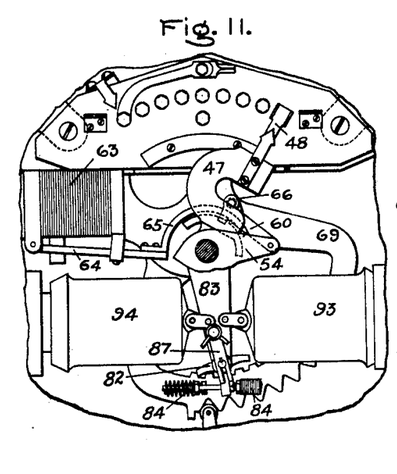
Figs. 11, 12, 13, and 14 illustrate the operation of the controller and indicator.
Figure 12:
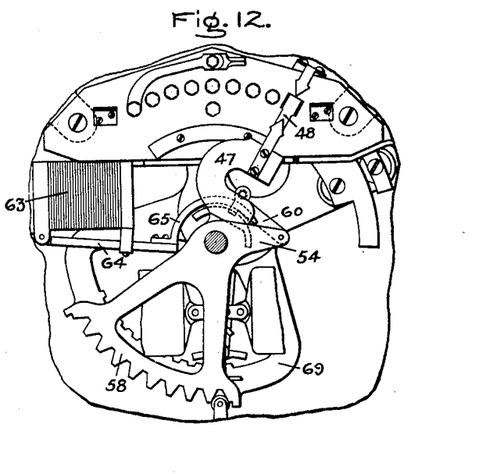
Figure 13:
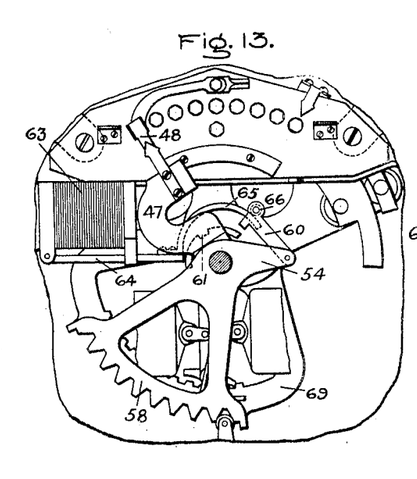
Figure 14:
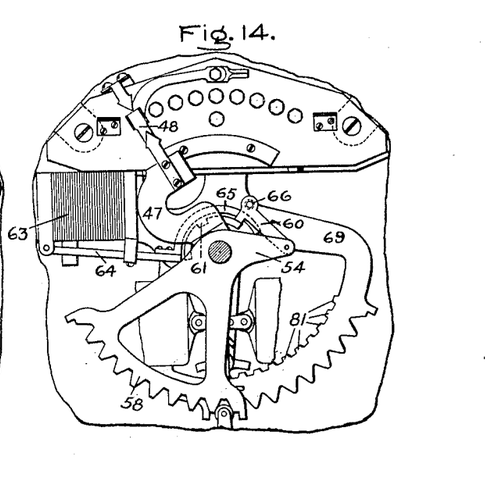
Figure 15:
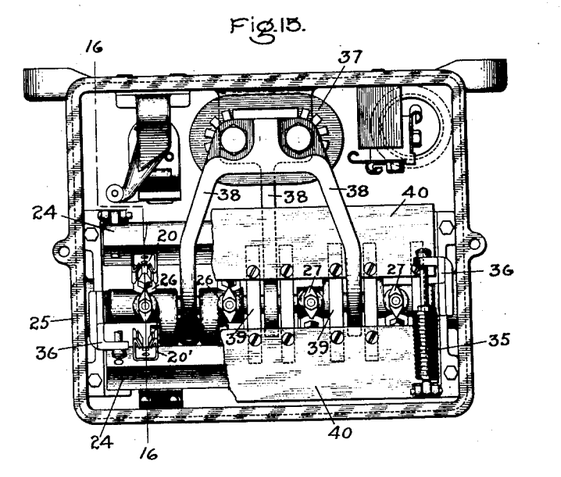
Fig. 15 is a top plan view of the reverser.
Figure 16:
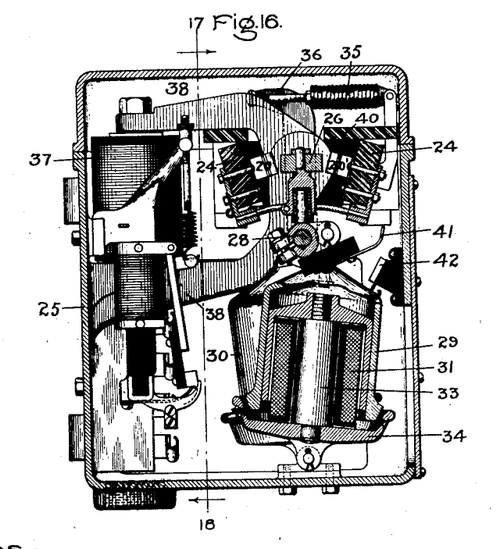
Fig. 16 is a vertical cross-section on the line 16 16, Fig. 15.
Figure 17:
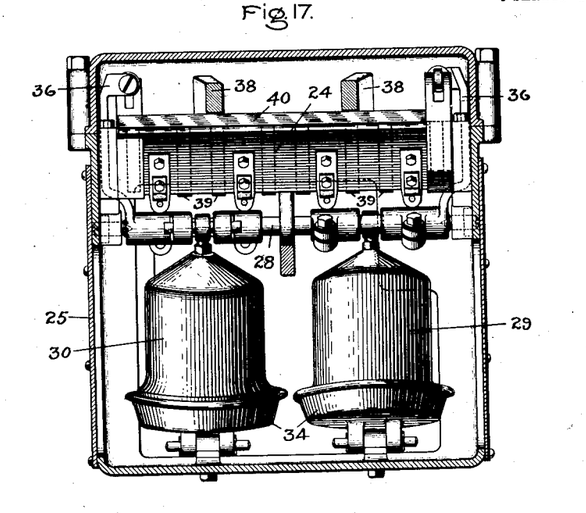
Figs. 17 and 18 are vertical sectional elevations on the line 17 18, Fig. 16, looking, respectively, in the directions indicated by the arrows at the top and bottom of Fig. 16.
Figure 18:
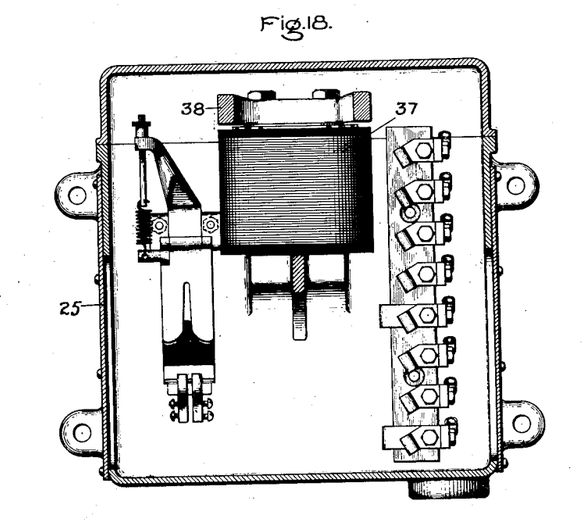
Figure 19:
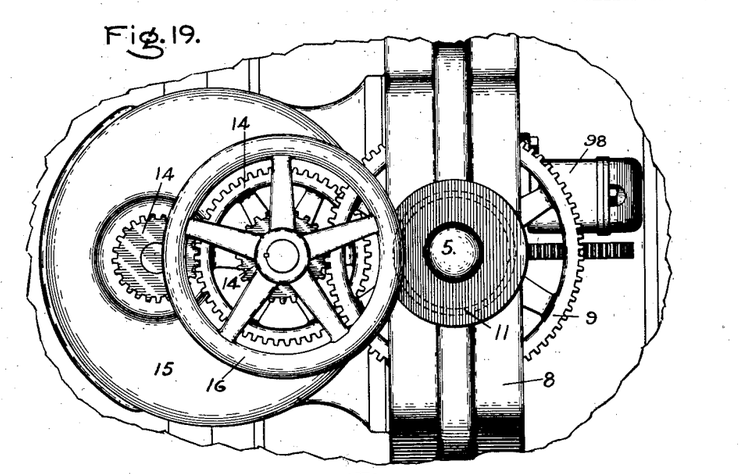
Fig. 19 is a top plan view of the motor and gearing.
Figure 20:
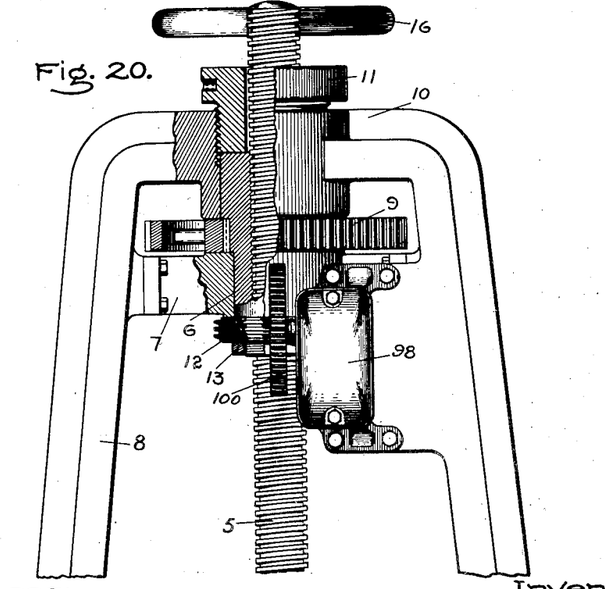
Fig. 20 is a sectional elevation of the valve-stem, nut, and interrupter.
Figures 21, 22, 23, 24, 25:
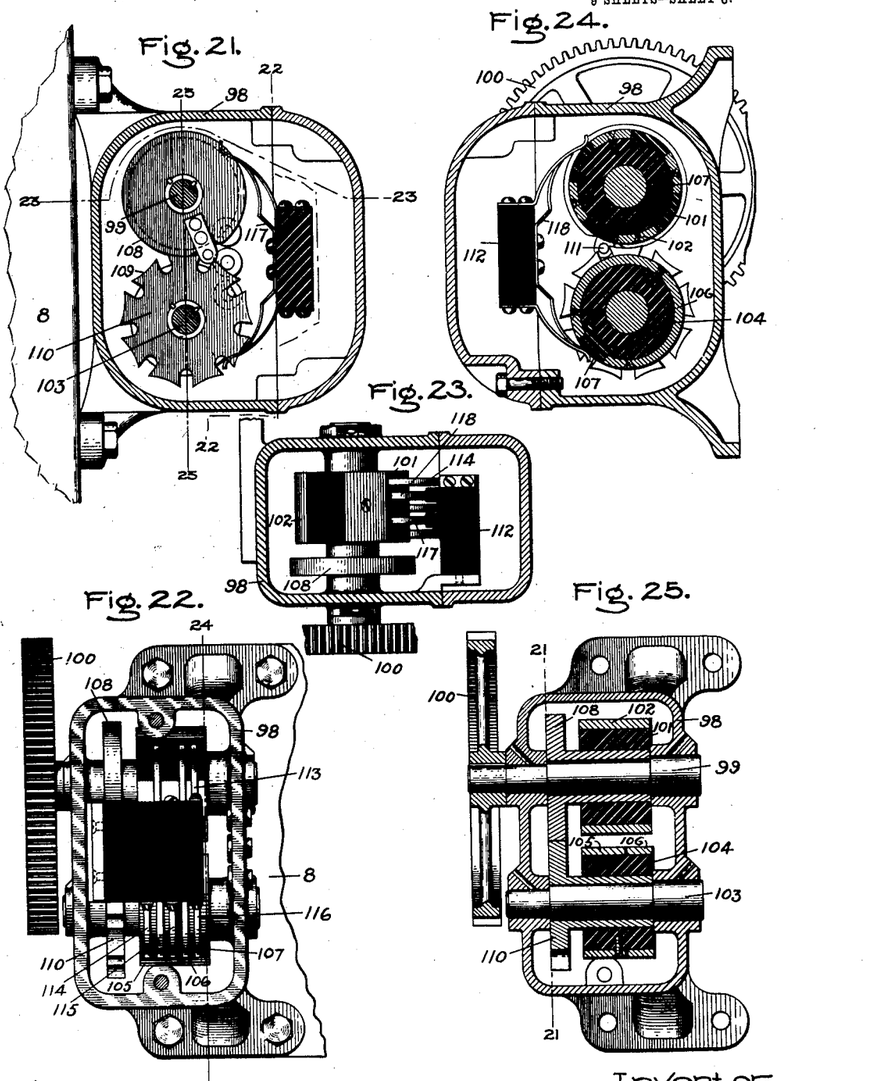
Fig. 21 is a sectional end elevation of the interrupter on the line 21 21, Fig. 25.
Fig. 22 is a front sectional elevation on the line 22 22, Fig. 21.
Fig. 23 is a plan view on the line 23 23, Fig. 21.
Fig. 24 is a sectional end elevation on the line 24 24, Fig. 22.
Fig. 25 is a section on the line 25 25, Fig. 21.

In Fig. 11 the switch-arm is shown as having been moved to the extreme right-hand end of its travel in a position to effect a full opening of the valve. The pawl is in engagement with the first tooth of the ratchet, and the index 73 is over the first stud 51, showing that the valve has not yet begun to open. In Fig. 12 the index 73 has traveled to the last stud 51 and coincides with the index 52 on the switch-arm, showing that the valve has fully opened. In Fig. 13 the index 73 shows that the valve is still wide open, but the emergency-coil 63 has tripped the clutch and the switch-arm has sprung back to the first stud, in position to cause the motor to shut the valve. In Fig. 14 the index 73 shows that the valve has shut, the switch-arm still remaining unclutched from the handle. By turning the latter counter-clockwise the latch 60 will be carried back until it drops into the notch 61, when the parts will be restored to the condition in which they appear in Fig. 2. Whenever the valve is closed, it is desirable to seat it with a pressure which is always constant. In view of the fact that the wear of the valve and its seat will vary the exact number of revolutions of the spindle necessary to accomplish this result it follows that some means must be provided for insuring the operation of the motor until the valve is shut tight irrespective of the regular movements of the circuit-interrupter and ratchet-wheel. The preferred arrangement for accomplishing this will now be described.

When the ratchet-wheel in its backward movement brings the insulating-block 72 under the first (left-hand) contact-stud 51, the circuit through the wire 122 is not thereby broken, because the conducting-strip 80 still connects said stud 51 with the stud 78.

From the closing reverse-magnet 32 there are two paths to the negative main 18, one through the interrupter by way of brushes 115 and 114 and the wires 125 120 and lead 19' and the other by way of the wire 123 through the contacts 42 and the switch 43. The latter is normally closed, while the break at the contacts 42 is closed when the magnet 32 is energized and swings the bridging-contacts 41 against the contacts 42. Just as the valve reaches its seat the insulating-segment 107 on the drum 104 breaks the circuit of the ratchet-wheel magnet 92 and also opens the circuit of the reverser-magnet 32 through the interrupter; but the other circuit of the magnet 32 through wire 123 remains closed, and hence the motor continues to operate, forcing the valve firmly home. The increased load on the motor, due to the stopping of the valve, soon causes the overload-coil to open the switch 43 and deënergize the magnet 32, thereby opening the reversing-switch and open-circuiting the motor.

Figure 1:
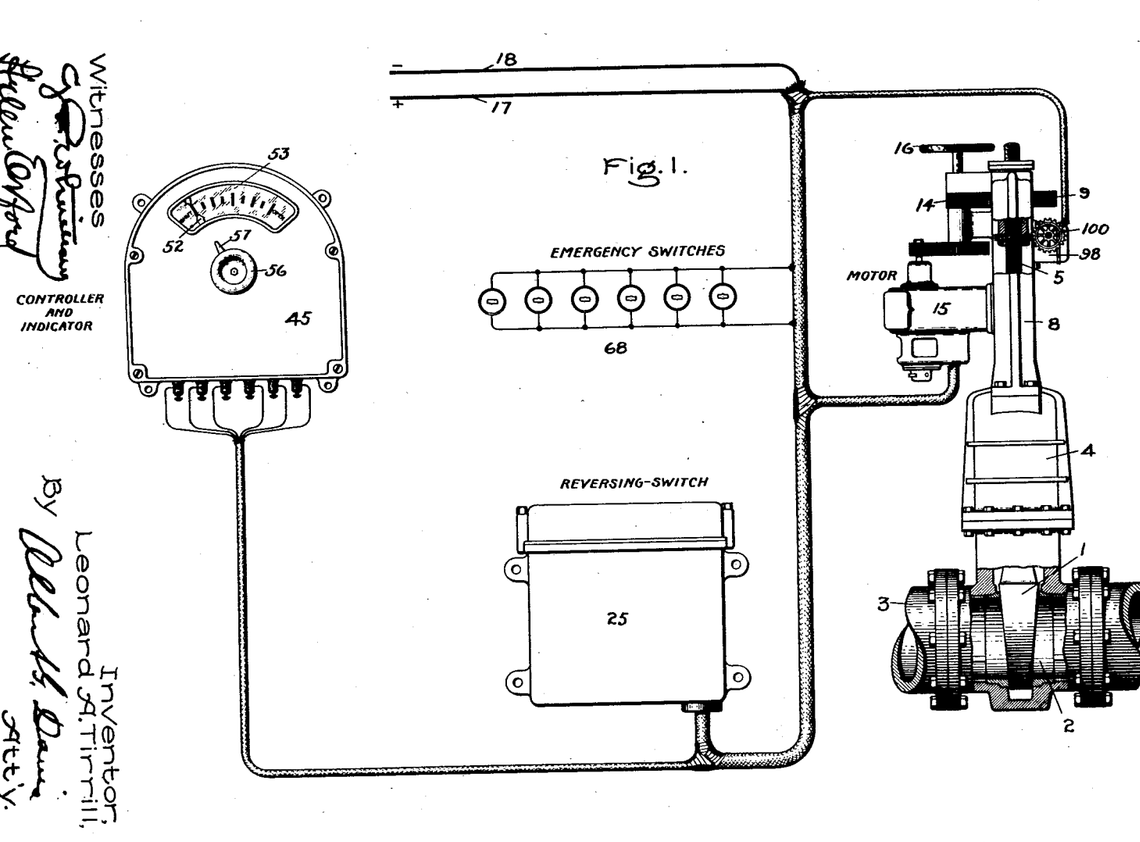
Figure 1 is a diagrammatic assembling of the entire system.
Figure 2:
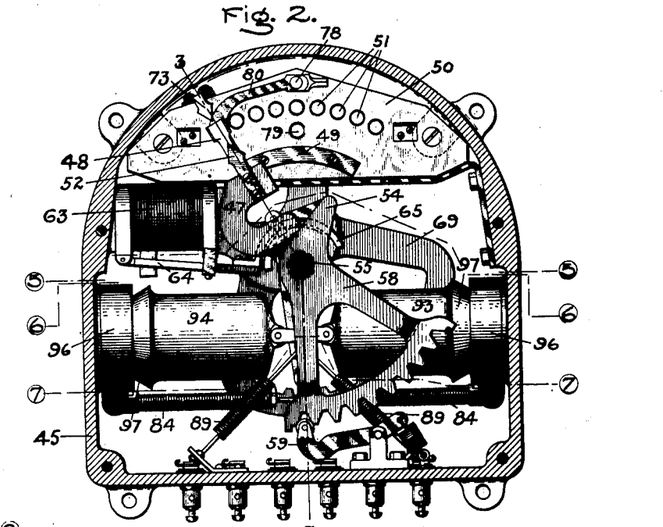
Fig. 2 is a front elevation of the combined controller and indicator on the line 2 2, Fig. 3.
Figure 3:
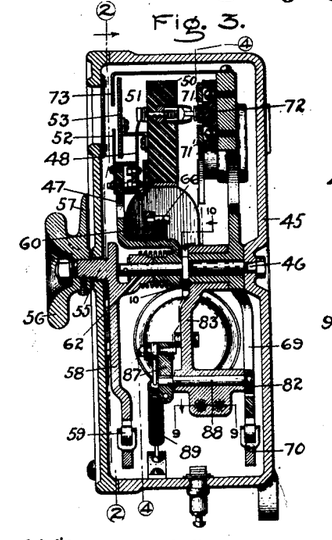
Fig. 3 is an upright cross-section of the same on the line 3 3, Fig. 2.
Figure 4:
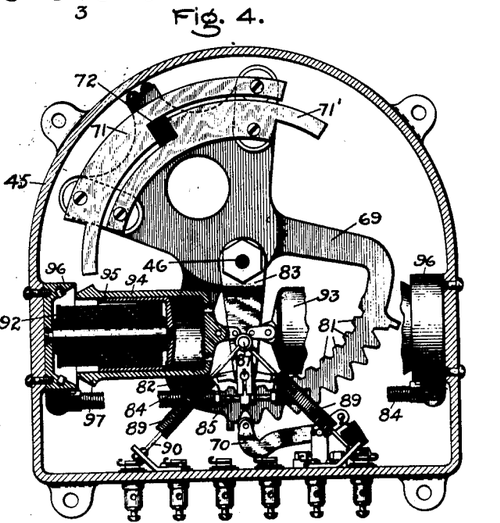
Fig. 4 is a sectional front elevation on the line 4 4, Fig. 3.
Figure 5:
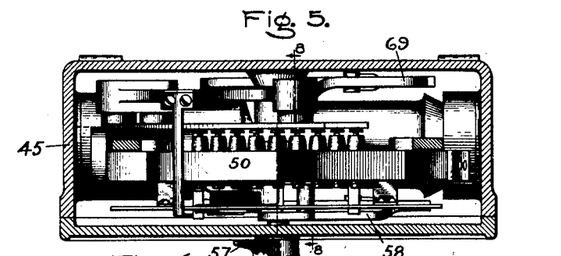
Figs. 5, 6, and 7 are horizontal cross-sections on the lines 5 5, 6 6, and 7 7, respectively, Fig. 2.
Figure 6:
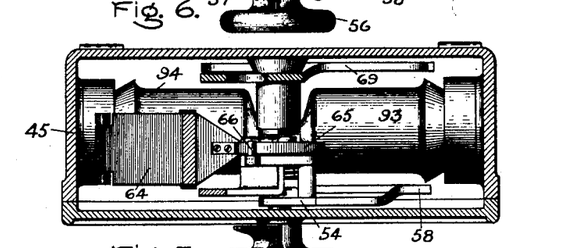
Figure 7:
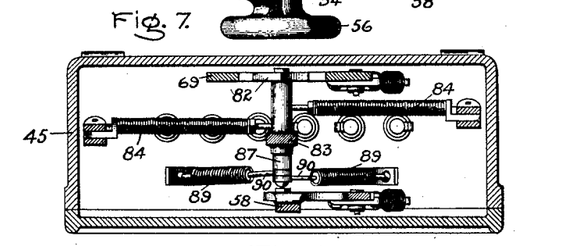

The various leads and control-circuit conductors are in practice grouped in a cable, as shown in Fig. 1. It will be noted that only four wires are necessary for connecting the controller and indicator with the reversing-switch and interrupter.

While the invention has been described as applied to a valve, yet it is evident that it is applicable to any device in which a predetermined to-and-fro travel is required to be effected—such, for instance, as a railway switch or signal, a bulkhead-door, a rudder, a gun-turret, a search-light, an electric-circuit controller, and many other kinds of apparatus and machinery.

What I claim as new, and desire to secure by Letters Patent of the United States, is—

1. In a system of remote control, a member to be moved, a motor for moving the same, a distant-control station, a controller for said motor and a combined indicator and circuit-breaker at said station, actuating means for said combined indicator and circuit-breaker, and operative connections between said member and said actuating means for the combined indicator and circuit-breaker.

2. In a system of remote control, a member to be moved, a motor for moving the same, a distant-control station, a controller for said motor arranged to determine the extent of movement of said member and an indicator at said station, operative connections between said indicator and said member for causing said indicator to indicate the position of said member, and means associated with said indicator for interrupting the motor-circuit when the indicator registers the position of the member predetermined by the controller.

3. In a system of remote control, a member to be moved, a motor for moving the same, a distant-control station provided with a controller having a plurality of positions corresponding to positions of said member and a combined indicator and circuit-breaker device having similar positions and arranged to cause the motor-circuit to be interrupted when its position corresponds to that of the controller, and operative connections between said member and said combined indicator and circuit-breaker device.

4. In a system of remote control, a member to be moved, a motor for moving the same, a distant-control station, a controller at said station having a plurality of positions corresponding to positions of said member, a circuit-breaker device at said station having similar positions and arranged to cause the motor-circuit to be interrupted when the circuit-breaker device and the controller attain corresponding positions, and means controlled by said member for moving said circuit-breaker device step by step in synchronism therewith.

5. Means for operating a member from a distant station, comprising a reversible electric motor geared to said member, an electrically-actuated reversing-switch, a controller therefor at said station, a combined electric indicator and circuit-breaker device adjacent to said controller, and circuit connections between said indicator and said member.

6. Means for operating a member from a distant station, comprising a reversible electric motor geared to said member, an electrically-actuated reversing-switch, a switch at said station controlling said reversing-switch, a circuit-opener in circuit with said switch, electrical means for actuating said circuit-opener, and a device driven by said member for controlling said electrical means.

7. In a sysetm of control, a motor, a controller and connections including a series of stationary contacts and a movable contact for engaging with said stationary contacts, a movable contact device engaging with said stationary contacts, and means controlled by said motor for actuating said movable contact device.

8. In a system of control, a motor, a controller comprising a series of stationary contacts and a pair of movable contact devices for engaging with said series of stationary contacts, manual operating means for one of said movable contact devices, and means controlled by said motor for actuating the other movable contact device.

9. In a system of control, a motor, a controller comprising a series of stationary contacts and a pair of movable contact devices for engaging with said series of stationary contacts, manual operating means for moving one of said contact devices into engagement with any one of said stationary contacts, and means controlled by said motor for moving the other contact device into operative relation with the same stationary contact.

10. In a system of control, a member to be moved, a motor, a controller comprising a series of stationary contacts and a pair of movable contact devices for engaging with said series of stationary contacts, each of said movable contact devices having a plurality of positions corresponding to positions of said member, means for moving one of said contact devices into any one of its positions to determine the position of said member, and means controlled by said member for moving the other contact device to the corresponding position when said member reaches the predetermined position.

11. In a system of control, a motor, a controller including a series of stationary contacts and a pair of movable contact devices for engaging with said stationary contacts and connected and arranged to cause the motor-circuit to be completed when occupying different positions and to interrupt the motor-circuit when occupying corresponding positions, means for moving one of said contact devices, and means controlled by the motor for moving the other contact device.

12. In a system of control, a member to be moved, a motor, a controller comprising a series of stationary contacts, a movable contact device arranged to engage with said stationary contacts to close a circuit through said motor, and a second movable contact device for engaging with said fixed contacts and coöperating with said first contact device to interrupt the motor-circuit when the two contact devices occupy corresponding positions, means for moving the first contact device to any of its positions, and means controlled by said member for moving the second contact device to the position corresponding to that of the first contact device.

13. In a system of control, a member to be moved, a motor, a controller including a series of stationary contacts, a movable contact device coöperating with said stationary contacts for causing the motor to be energized, and a second contact device coöperating with said first contact device and said stationary contacts and arranged to deënergize the motor when the two contact devices occupy corresponding positions, means for moving the first contact device to any one of its positions to determine the position to which said member is to be moved, electromagnetic actuating means for said second contact device, and means controlled by said member for causing said actuating means to move its contact device into the position corresponding to that of the other contact device when said member reaches the predetermined position.

14. In a system of control, a motor, a normally open reversing-switch for said motor, a controller including a series of stationary contacts and a pair of movable contact devices for engaging with said stationary contacts and connected and arranged to complete a circuit through said reversing-switch when occupying different positions and to deënergize said reversing-switch when occupying corresponding positions, means for moving one of said contact devices, and means controlled by the motor for moving the other contact device to its corresponding position in synchronism with the motor.

15. Means for operating a member from a distant station, comprising a reversible electric motor geared to said member, an electrically-actuated reversing-switch, a switch at said station, a plurality of parallel paths for the current coöperating with said switch, a device at said station for connecting said paths with the reversing-switch, and means controlled by said member for actuating said device to break said connection when said member has moved a predetermined distance.

16. Means for operating a member from a distant station, comprising a reversible electric motor geared to said member, an electrically-actuated reversing-switch, a switch at said station, a plurality of parallel paths through any one of which current may be sent by said switch, means for connecting said paths with the reversing-switch, electrical means for cutting out said paths in succession, and a circuit-controller for said cut-out actuated by said member.

17. Means for operating a reversible electric motor from a distant station, comprising a reversing-switch, electromagnetic coils for operating it, two movable segments at said station respectively connected with said coils and having a non-conducting portion between them, a switch-arm adapted to send current into either one of said segments, and means actuated by the motor for moving said segments to break the circuit by interposing said non-conducting portion between said switch-arm and said segments.

18. Means for operating a reversible electric motor from a distant point, comprising a reversing-switch, two electromagnets for operating it, two movable metallic segments having their adjacent ends separated by a non-conducting portion and each in circuit with one of said magnets, a plurality of contact-studs in line with said segments and non-conducting portion, a switch-arm adapted to send current through any one of said studs, an electrically-actuated pawl-and-ratchet device for moving said segments, and a circuit-interrupter for said device, actuated by the motor.

19. Means for operating a reversible electric motor from a distant station, comprising a reversing-switch, two electromagnets for operating it, two movable metallic segments having their adjacent ends separated by a non-conducting portion and each in circuit with one of said magnets, a double pawl and ratchet for moving said segments in either direction, two electromagnets for actuating said pawl, each in circuit with one of said segments, a circuit-interrupter for said pawl-actuating magnets driven by the motor, a plurality of studs in contact with said segments, and a switch-arm for sending current through any one of said studs.

20. In a system for controlling a reversible electric motor, a reversing-switch comprising two parallel bars of insulation, four contact-clips on each bar, a rock-shaft parallel with said bars, two pairs of connected switch-blades carried by said shaft, and two pivoted electromagnets having their armatures pivotally attached to rock-arms on said shaft.

21. In a system for controlling a reversible electric motor, a reversing-switch comprising two parallel bars of insulation, four opposing clips secured to each bar, a rock-shaft parallel with said bars, two electromagnets having armatures pivoted to rock-arms on said shaft, two pairs of connected switch-blades carried on said shaft, barriers of insulation between said blades, and a blow-out magnet having three pole-pieces extending between said blades.

22. Means for automatically causing a reversible electric motor to revolve a predetermined number of times in either direction, and means for automatically increasing the number of revolutions in one direction.

23. In combination, a motor, means for causing said motor to make a predetermined number of revolutions in either direction, and means controlled by the load on the motor for permitting said motor to make an additional number of revolutions in one direction.

24. In combination, a motor, means independent of the load for causing said motor to make a predetermined number of revolutions in either direction, and means dependent upon the load for increasing the number of revolutions in one direction.

25. In combination, a motor, means including a device geared to the motor for causing the motor to make a predetermined number of revolutions in either direction, and means controlled by the load on the motor for permitting an additional number of revolutions in one direction.

26. In combination, a motor, means for causing said motor to make a predetermined number of revolutions in either direction, and means for permitting said motor to continue its rotation in one direction until the load reaches a predetermined value.

27. In combination, a motor, means for supplying said motor with current until it has made a predetermined number of revolutions in either direction, and means for continuing the current-supply during the operation of the motor in one direction until a predetermined load is reached.

28. In combination, a motor, a reversing-switch, means for maintaining said reversing-switch closed during a predetermined number of revolutions of the motor in either direction, and means for maintaining said switch closed after the motor has made the predetermined number of revolutions in one direction and until the motor-load reaches a predetermined value.

29. In combination, a motor, a controlling-switch, a device controlled by said motor and coöperating with said switch to cause the motor to make a predetermined number of revolutions in either direction, and means dependent upon the motor-load for permitting an additional number of revolutions of the motor in one direction.

30. In combination, a motor, a reversing-switch, a controlling-switch, a device controlled by said motor and coöperating with said reversing-switch to maintain it closed while the motor makes a predetermined number of revolutions in either direction, and means for maintaining said reversing-switch closed after the motor has made the predetermined number of revolutions in one direction and until the motor-load reaches a predetermined value.

31. In combination, a motor, a reversing-switch, electromagnets for actuating said switch, means for maintaining the respective electromagnets energized during a predetermined number of revolutions of the motor in either direction, and additional means including an overload-relay for maintaining one of said electromagnets energized after the motor has made the predetermined number of revolutions.

32. In combination, a motor, a reversing-switch, electromagnets for actuating said reversing-switch, a controller and connections for energizing said electromagnets including a series of fixed contacts and a movable contact, a movable contact device engaging with said fixed contacts, means controlled by said motor for actuating said contact device, and additional means including an overload-relay in the motor-circuit for energizing one of said electromagnets.

33. Means for opening and closing a valve or the like, comprising a reversible electric motor, in combination with a reversing-switch, means for automatically opening said switch at each end of the travel of the valve, and means for keeping said switch closed, when the valve is closing, until said valve is firmly seated.

34. In a system for controlling a reversible electric motor, the combination with a reversing-switch, of two electromagnets for operating it, an overload-coil in circuit with the motor, a circuit including one of said electromagnets, and two switches in said circuit, one controlled by said magnet and the other by the overload-coil.

35. Means for tightly closing a valve or the like, comprising an electric motor, a switch for the same, an electromagnet for closing said switch, two parallel circuits from said magnet, a circuit-interrupter in one circuit, two switches in the other circuit, one of which is normally closed and the other open, means for closing the latter when the magnet is energized, and an overload-coil in series with the motor and arranged to open the normally closed switch when the stopping of the valve overloads the motor.

36. In a system for operating an electric motor from a distant station, the combination with a plurality of stationary contact-studs, of a pivoted switch-arm coöperating therewith, a wheel pivoted concentrically with said arm, two segments insulated from said wheel and from each other and making contact with said studs, an insulating-block between said segments, and means for imparting to said wheel a step-by-step movement in synchronism with said motor.

37. The combination with a board containing a plurality of contact-studs, of a pivoted switch-arm coöperating therewith, a ratchet-wheel pivoted concentrically with said arm, two segments insulated from said wheel and from each other and making contact alternately with said studs, an insulating-block between said segments, a double-ended pawl in engaging relation with said ratchet-wheel, and two electromagnets for operating said pawl in opposite directions.

38. In a circuit-controlling device, the combination with a pivoted switch-arm, of a board, a series of contact-studs in said board, metallic cups let into the back of said board and attached to said studs, spring-actuated plugs in said cups, and movable segments sliding in contact with said plugs.

39. In a circuit-controlling device, the combination with a ratchet-wheel carrying contact-segments, of an arm pivoted concentrically with said wheel, a pawl pivoted to said arm and adapted to engage with said ratchet-wheel, an electromagnet having an armature pivoted to said arm, and a spring for restoring said arm to a normal position.

40. In a circuit-controlling device, the combination with a ratchet-wheel carrying contact-segments, of an arm pivoted concentrically with said wheel, a shaft journaled in said arm, a double pawl on said shaft adapted to engage with said ratchet-wheel, a crank on said shaft, opposed electromagnets for actuating said arm, and means for holding the crank stationary.

41. In a circuit-controlling device, the combination with a ratchet-wheel carrying contact-segments, of an arm pivoted concentrically with said wheel, a shaft journaled in said arm, a double pawl on said shaft adapted to engage with said ratchet-wheel, a crank on said shaft, yielding stays attached to said crank, opposed electromagnets for actuating said arm, and springs for holding it in a normal position.

42. A circuit-interrupter comprising a pair of parallel shafts, drums of insulation on said shaft, longitudinal conducting-segments on one drum, two separate slit metal bushings on the other drum, contact-brushes bearing on said drums, and gearing connecting said shafts.

43. A circuit-interrupter comprising a pair of parallel shafts, drums of insulation on said shafts, longitudinal conducting-segments on one drum, two separate slit metal bushings on the other drum, two connecting-strips bearing on said drums, one on each bushing, contact-brushes bearing on said drums, and an interlocking carrying-gear connecting said shafts.

In witness whereof I have hereunto set my hand this 6th day of September, 1904.

LEONARD A. TIRRILL.

Witnesses:
JOHN A. MCMANUS, Jr.,
GEO. W. BEADLE.